United States Patent [19]

Balhadere et al.

[11] Patent Number: 5,336,522
[45] Date of Patent: Aug. 9, 1994

[54] METHOD OF MANUFACTURING PARTS MADE OF CERAMIC MATRIC COMPOSITE MATERIAL

[75] Inventors: Aline Balhadere, Vendays Montalivet; Bruno Bernard, Fystnes; Jacques A. Moreau, Bordeaux; Isabelle Mouricou, Arsac; Christian Robin-Brosse, Le Haillan, all of France

[73] Assignee: Societe Europeenne de Propulsion, Suresnes, France

[21] Appl. No.: 13,816

[22] Filed: Feb. 2, 1993

[30] Foreign Application Priority Data

Feb. 4, 1992 [FR] France .................. 92 01237

[51] Int. Cl.$^5$ ............................... B05D 3/02
[52] U.S. Cl. ..................... 427/226; 427/228; 427/249; 427/340
[58] Field of Search ............... 427/340, 226, 228, 249

[56] References Cited

U.S. PATENT DOCUMENTS

| | | | |
|---|---|---|---|
| 3,271,182 | 9/1966 | Varlet | 427/340 X |
| 4,748,079 | 5/1988 | Thebault | 428/288 |
| 4,752,503 | 6/1988 | Thebault | 427/248.1 |
| 4,933,213 | 6/1990 | Fourquier et al. | 427/340 X |
| 5,071,679 | 12/1991 | Heraud et al. | 427/264 |

FOREIGN PATENT DOCUMENTS 2640258  6/1990  France .

OTHER PUBLICATIONS

Chemical Abstract, "Manufacture of Carbon-Based Products", vol. 114, No. 14, 1990, Columbus, Ohio, abstract No. 127824Z, Y. Suda Primary Examiner—Michael Lusignan
Attorney, Agent, or Firm—Weingarten, Schurgin, Gagnebin & Hayes

[57] ABSTRACT

A fiber preform is initially consolidated by being impregnated with a thermosetting impregnation composition that contains a ceramic precursor, and by heat treatment at the end of which the precursor has been transformed into ceramic, without passing through a meltable phase. The consolidated preform is then densified. The impregnation composition is constituted by a mixture of a thermosetting monomer and a ceramic precursor polymer, and the monomer is cross-linked during the heat treatment so as to achieve "in situ" cross-linking of the polymer mixture prior to transforming the precursor into ceramic.

12 Claims, No Drawings

METHOD OF MANUFACTURING PARTS MADE OF CERAMIC MATRIC COMPOSITE MATERIAL

The present invention relates to manufacturing parts made of ceramic matrix composite (CMC). More precisely, the invention relates to a method of manufacturing CMC parts, the method being of the type comprising making a fiber preform which is then consolidated by being impregnated by means of a liquid, and with the consolidated preform then being densified.

BACKGROUND OF THE INVENTION

Together with carbon/carbon composites, CMCs are thermostructural composite materials that are characterized by good mechanical properties that make them suitable for building structural elements, and by their ability to retain these mechanical properties up to high temperatures.

Thermostructural composites are used in particular in aviation and in space applications, and in particular for making parts of aircraft engines, or structural elements of space vehicles.

The manufacture of a part made of composite material generally comprises making a fiber preform to a shape that is close to that of the part to be manufactured, and then in densifying the preform with the matrix.

The fiber preform constitutes the reinforcement of the part to which it essentially confers its mechanical properties. The preform is obtained from fiber products such as thread, cloth, felt, etc. Shaping is performed by reeling, weaving, stacking two-dimensional plies of cloth or sheets of cables, . . .

Densification of the fiber preform with the matrix consists in filling the pores of the preform throughout its volume with the material that constitutes the matrix.

A first densification technique uses a liquid and consists in impregnating the preform with a liquid mixture that contains a precursor of the matrix material and then, optionally after drying and curing, in subjecting the impregnated preform to heat treatment in order to transform the precursor. Several consecutive cycles of impregnation and of heat treatment are generally necessary in order to achieve the desired degree of densification.

A second densification technique consists in infiltrating the preform with the material from which the matrix is made by chemical vapor infiltration (CVI). To this end, the preform is placed in an infiltration oven into which a gas is admitted. Under determined conditions of temperature and pressure, the gas penetrates into the core of the preform and, on contact with the fibers, the matrix material is formed by the gas decomposing or by component parts of the gas reacting.

In order to enable the fiber preform to retain the desired shape while chemical vapor infiltration is taking place, it is necessary at least during a first portion of the densification process, to hold the preform in tooling, generally made of graphite. Such solid tooling is expensive to make, in particular when the preform is complex in shape. It also needs to have numerous holes machined therein in order to provide the gas with access to the preform through the tooling. In addition, the tooling is heavy and bulky.

Unfortunately, chemical infiltration is a process that is generally very lengthy and very expensive. For example, a densification process typically requires several hundreds of hours. In addition, tooling that occupies an appreciable fraction of the working volume of the infiltration oven and having significant thermal inertia constitutes a drawback. Furthermore, matrix material is inevitably deposited on the tooling, with the consequence of large numbers of rejects due to the preform adhering to the tooling. Even in the best of cases, such deposits require the tooling to be renewed frequently.

Tooling is required during chemical vapor infiltration only until the preform has been consolidated. This stage is reached when a sufficient quantity of the matrix-forming material has been deposited to bond the fibers together throughout the volume of the preform so that after the tooling is removed the preform remains in the desired shape and can be handled. Densification can then be completed with the preform free from tooling. The tooling is nevertheless necessary during at least a portion of infiltration, and infiltration must be interrupted in order to enable the tooling to be withdrawn once the preform has been consolidated.

It is therefore desirable to be able to perform the entire chemical vapor infiltration process without it being necessary to hold the preform in tooling.

When the composite material has a carbon matrix, it is possible, prior to chemical vapor infiltration, to consolidate the preform by means of a liquid. The preform is impregnated with a precursor of carbon, e.g. a resin having a high coke content. The impregnated preform while held in tooling, also known as a "shaper", is dried so as to eliminate any solvent, and then the carbon-precursor resin is polymerized (cured) and heat treatment is performed to cause pyrolysis of the precursor and to leave a carbon residue that consolidates the preform.

An analogous consolidation technique could be devised for use with CMC. However, tests performed by the Applicant in which a fiber preform is consolidated by being impregnated by means of a liquid constituting a precursor of an organosilicon type ceramic, in particular polycarbosilane (PCS) as a precursor for silicon carbide (SiC), by using the conventional methods for cross-linking such precursors, have not given satisfaction.

CMC parts have been made from fiber preforms made of carbon or of silicon carbide, consolidated by being impregnated with a PCS solution, dried, cross-linked by the oxygen in the air, and heat treatment, and the consolidated preforms were densified by chemical vapor infiltration using silicon carbide. Parts made in this way demonstrate mechanical properties that are considerably less good than those obtained when consolidation is performed by chemical vapor infiltration.

This deterioration in mechanical properties appears to stem from the technique used for cross-linking the PCS. Uniform cross-linking throughout the volume of the preform is practically impossible to obtain, in particular when the preform is thick. As a result, a cross-linking gradient exists and zones may even be present where the PCS is not cross-linked, i.e. where it has not been made unmeltable, and as a result it takes up the liquid state during the heat treatment. Furthermore, it is necessary to use very strong tooling for holding purposes in order to counter substrate deformation due to the production of volatile species during pyrolysis. In addition, the presence of oxides in the ceramic residue runs the risk of putting a limit on the refractory properties of the CMC.

Other known techniques for cross-linking PCS, such as cross-linking by means of sulfur or by electromagnetic radiation, or by electron beam process, or by plasma treatment, cannot give satisfaction either, even if the inclusion of oxygen into the ceramic residue is avoided.

Sulfur may constitute a source of pollution. Use of radiation generally leads to long-duration treatment and, like electron beam process, requires an installation that is cumbersome and expensive. Finally, plasma treatment also requires an expensive installation and is effective over a limited thickness only.

An object of the present invention is thus to provide a method of manufacturing CMC parts in which the preform can be consolidated by liquid impregnation using a ceramic precursor, prior to being densified by means of a liquid or by means of chemical vapor infiltration, while avoiding the above-mentioned drawbacks, and without degrading the mechanical properties of the resulting parts.

SUMMARY OF THE INVENTION

According to the invention, this object is achieved by the fact that the impregnation for the purpose of consolidating the fiber preform is performed by means of a thermosetting impregnation composition containing a ceramic precursor, and the consolidation of the preform is obtained by heat treatment at the end of which the precursor is transformed into ceramic without passing through a meltable phase.

The impregnation composition is advantageously constituted by a mixture of a thermosetting monomer and a ceramic-precursor polymer. The monomer is cross-linked during the heat treatment, thereby achieving "in situ" cross-linking of the polymer mixture prior to transformation of the precursor into ceramic. It is important to observe that the polymer mixture is cross-linked uniformly throughout the volume of the preform, regardless of the thickness thereof.

The impregnation composition may further include an accelerator for accelerating cross-linking of the thermosetting monomer.

In an implementation of the invention, the ceramic precursor is an organosilicon polymer such as PCS, a precursor for SiC, while the thermosetting monomer is an acrylic monomer. It is then possible to use dicumyl peroxide as an accelerator for adding to the impregnation composition to accelerate cross-linking of the monomer.

The acrylic monomer is selected from those possessing a solvent in common with the organosilicon polymer. It is also preferable for the resulting acrylic polymer to have a coke content that is as low as possible in order to avoid leaving any significant quantity of carbon residue after pyrolysis.

Three-function monomers constituted by trimethylol propane trimethacrylate (TMPTMA) and trimethylol propane triacrylate (TMPTA) are suitable for this purpose, their coke contents being respectively 2% and 5% by weight.

Other multi-function acrylic monomers may be used, such as ethoxy acrylates, isocyanurate acrylates, erythritol acrylates, and epoxy acrylates, for example.

When the ceramic precursor is PCS and when it is associated with an acrylic monomer such as TMPTMA or TMPTA, the solvent used for making the liquid impregnation composition is selected, for example, from hexane and 1,1,1-trichloroethane (TCE).

DETAILED DESCRIPTION

Examples of the method of the invention for manufacturing parts made of SiC matrix composite material are described below by way of non-limiting indication.

In the examples, the impregnation composition is constituted by PCS and TMPTMA, in solution in TCE or in hexane, together with dicumyl peroxide as an accelerator of TMPTMA cross-linking. The respective quantities by weight of PCS and of TMPTMA in the impregnation composition lie in the range 80/20 to 40/60, and are preferably about 60/40. The concentration of the dicumyl peroxide is about 2% to 3% by weight relative to the weight of the TMPTMA.

EXAMPLE 1

In this example the preform is impregnated for consolidation purposes after it has been shaped.

The preform is made by cutting out plies of cloth, by stacking the plies, and by inserting the stack of plies in shaping tooling to impart the desired shape and fiber fraction to the preform (where fiber fraction is the percentage of the apparent volume of the preform that is actually occupied by fibers).

While the preform is held in the tooling, a thin coating of carbon is deposited on the fibers for the purpose of constituting an interphase between the fibers of the preform and the ceramic material of the matrix. The carbon interphase may be constituted by a resin coke, as described in U.S. Pat. No. 4,748,079, or by pyrolytic carbon obtained by chemical vapor infiltration, as described in U.S. Pat. No. 4,752,503.

An impregnation composition is prepared by dissolving 60 parts by weight (pbw) of coarsely ground PCS in 90 pbw of TCE. After complete dissolution, 40 pbw of TMPTMA and 0.80 pbw of dicumyl peroxide are added.

The preform, held in its tooling and provided with the carbon interphase, is placed in an enclosure where a vacuum is established prior to the impregnation composition being inserted therein.

Following impregnation and returning to atmospheric pressure, a drying step is performed in an oven at around 80° C. to cause the solvent to completely evaporate, leaving an homogeneous translucent phase or "gel".

The TMPTMA is then cross-linked in the oven by raising the temperature of the preform to 90° C. for a period of 1 hour, and then to 120° C. or even 150° C. for a period of one and a half hours.

While the preform is still held in its tooling, it is subjected to pyrolysis heat treatment in a furnace under an inert atmosphere (nitrogen sweeping). During the heat treatment, the temperature is raised progressively to 900° C. during a period lying in the range 40 hours to 130 hours, so as to transform the unmeltable polymer mixture into SiC.

After heat treatment, the preform consolidated by the SiC from the PCS is withdrawn from the tooling and is placed in an SiC infiltration furnace to be densified by chemical vapor infiltration, e.g. as described in patent FR 2 401 888. Densification is continued until the residual porosity lies in the range 10% to 15%.

Table I below gives the results of tensile tests performed on parts A and B manufactured in this way, respectively from a preform made of carbon fiber cloth and a preform made of SiC fiber cloth. Before impregnation, the preforms were provided with an interphase coating of pyrolytic carbon (PyC) having a thickness of 1 micron for the carbon fibers, and a thickness of 0.1 microns for the SiC fibers. The deposit was obtained by chemical vapor infiltration. Table I also gives the results of tensile tests performed on a part C manufactured in similar manner, but using a preform made of SiC fiber cloth and subjected to chemical treatment for the particular purpose of eliminating the silica present at the surface of the fibers, as described in U.S. Pat. No. 5,071,679. After that treatment, a 0.1 micron thick pyrolytic carbon interphase was made by chemical vapor infiltration.

By way of comparison, Table I also shows the results of identical tensile tests performed on parts A', B', and C' made using the same preforms as the parts A, B, and C, using the same respective interphases, but consolidated by chemical vapor infiltration (using a gas) as in the prior art.

In Table I, $\sigma_T$, $\epsilon$ and E respectively designate traction strength, strain, and Young's modulus. The relative density (d) of the parts is also given.

TABLE I

| Part | A | B | C | A' | B' | C' |
|---|---|---|---|---|---|---|
| Preform | C cloth | SiC cloth | SiC cloth | C cloth | SiC cloth | SiC cloth |
| PyC interphase | 1 μm | 0.1 μm | 0.1 μm | 1 μm | 0.1 μm | 0.1 μm |
| Consolidation | liquid | liquid | liquid | gas | gas | gas |
| $\sigma_T$ (MPa) | 440 | 210 | 300 | 480 | 180 | 280 |
| $\epsilon$ (%) | 1 | 0.37 | 0.69 | 0.95 | 0.21 | 0.60 |
| E (GPa) | 67 | 140 | 190 | 83 | 200 | 200 |
| d (g/cm$^3$) | 1.9 | 2.3 | 2.3 | 2.1 | 2.5 | 2.5 |

From Table I, it can be seen that the parts obtained by the method of the invention have mechanical performance of the same order as parts obtained by using a gas to consolidate the preform. The method of the invention is thus particularly advantageous since using a liquid to consolidate the preform makes it possible to achieve a cost price saving that has been calculated to be at least 30% because of the manufacturing time saved and because of the better utilization of the infiltration furnaces. It may also be observed that the method of the invention makes it possible to obtain parts of lower density than those in which the preform is consolidated by means of a gas.

EXAMPLE 2A

In this example, impregnation is performed on the fiber fabric used for making the preform, prior to shaping thereof.

Cloth made of carbon fibers and in the form of a roll, for example, is subjected to prior treatment to form a carbon interphase coating on the fibers. The coating is formed, e.g. by chemical vapor infiltration, so as to have relatively little thickness, e.g. about 0.1 micron, so as to avoid stiffening the cloth.

The cloth provided with its interphase coating is impregnated by being passed continuously through a bath and then dried in a tunnel at 80° C. during a transit time of 5 minutes. The impregnation composition is identical to that used in Example 1.

Dry plies of impregnated cloth are cut out and shaped in a hot press to obtain the desired preform. The temperature of the preform is raised uniformly to 80° C. and then with the plates of the press under pressure to avoid possible deformation of the preform, its temperature is raised to 120° C. over a period of 15 minutes and is then kept at this temperature for about 1 hour and a half.

After cooling in the press, the preform is removed for the purposes of pyrolysis and subsequent densification by SiC vapor infiltration as in Example 1.

EXAMPLE 2B

The procedure is the same as in Example 2A, but using a different impregnation composition constituted by 80 pbw of PCS, 80 pbw of hexane, 20 pbw of TMPTMA, and 0.6 pbw of dicumyl peroxide.

EXAMPLE 2C

The procedure is the same as in Example 2B, but using a different impregnation composition constituted by 40 pbw of PCS, 60 pbw of hexane, 60 pbw of TMPTMA, and 1.2 pbw of dicumyl peroxide.

Table II gives the results of tensile tests performed on parts D, E, and F obtained by the methods of Examples 2A, 2B, and 2C. By way of comparison, the results are shown as obtained on a part D' manufactured using a preform identical to that of part D, using the same carbon interphase, but consolidated by chemical vapor infiltration (i.e. by means of a gas), as in the prior art.

In Table II, ILSS designates interlaminar shear strength (i.e. resistance to shear parallel to the planes of the plies in the preform).

TABLE II

| Part | D | E | F | D' |
|---|---|---|---|---|
| Preform | C cloth | C cloth | C cloth | C cloth |
| Consolidation | liquid | liquid | liquid | gas |
| PCS/TMPTMA | 60/40 | 80/20 | 40/60 | |
| $\sigma_T$ (MPa) | 330 | 270 | 270 | 260 |
| $\epsilon$(%) | 0.81 | 0.68 | 0.62 | 0.87 |
| E (GPa) | 82 | 95 | 82 | 110 |
| ILSS (MPa) | 25 | about 21 | 20 | about 19 |
| d (g/cm$^3$). | 1.82 | 1.87 | 1.73 | 2 |

Table II shows that parts obtained by the method of the invention are lower in density than parts obtained by the prior art method, and that their performance is comparable, with the performance of the part D being substantially better than that of the parts E and F, moreover with a lower density.

EXAMPLE 3A

The procedure is the same as in Example 2A, but the carbon fiber cloth is replaced by an SiC fiber cloth.

EXAMPLE 3B

The procedure is the same as in Example 3A, but using a different impregnation composition constituted by 50 pbw of PCS, 75 pbw of TCE, 50 pbw of TMPTMA, and 1 pbw of dicumyl peroxide.

EXAMPLE 3C

The procedure is the same as in Example 3A but using a different impregnation composition, constituted by 40 pbw of PCS, 60 pbw of TCE, 60 pbw of TMPTMA, and 1.2 pbw of dicumyl peroxide.

Table III gives the results of tensile tests performed on parts G, H, and I obtained using the methods of Examples 3A, 3B, and 3C. By way of comparison, the results obtained on above-mentioned part B' are recalled.

TABLE III

| Part | G | H | I | B' |
|---|---|---|---|---|
| Preform | SiC cloth | SiC cloth | SiC cloth | SiC cloth |
| Consolidation | liquid | liquid | liquid | gas |
| PCS/TMPTMA | 60/40 | 50/50 | 40/60 | |
| $\sigma_T$ (MPa) | 210 | 200 | 220 | 180 |
| $\epsilon$(%) | 0.37 | 0.38 | 0.53 | 0.21 |
| E (GPa) | 140 | 120 | 110 | 200 |
| ILSS (MPa) | 39 | 20 | 13 | 30 |
| d (g/cm$^3$). | 2.4 | 2.3 | 2.1 | 2.5 |

Table III also shows that the method of the invention makes it possible to obtain parts that give comparable results to parts obtained by the prior art gas consolidation method, and in addition the parts have lower density.

We claim:

1. A method of manufacturing a part made of a ceramic matrix composite material comprising the steps of:

making a fiber preform having a shape substantially similar to a shape of the part being manufactured;

consolidating the fiber preform by:

impregnating the fiber preform with a liquid composition comprising a mixture of a thermosetting monomer and a ceramic precursor polymer to form an impregnated preform;

heating the impregnated preform to cause cross-linking of the thermosetting monomer and thereby achieving in-situ cross-linking of the ceramic precursor polymer throughout the impregnated preform and bringing the ceramic precursor polymer to a non-meltable state; and applying a heat treatment to transform the ceramic precursor polymer into ceramic which bonds fibers of the fiber preform together providing a consolidated preform; and densifying the consolidated preform with a ceramic matrix.

2. A method according to claim 1, wherein the impregnation composition further includes an accelerator for the cross-linking the thermosetting monomer.

3. A method according to claim 1, wherein the ceramic precursor is an organosilicon polymer and the thermosetting monomer is an acrylic monomer.

4. A method according to claim 3, wherein the impregnation composition further includes dicumyl peroxide as an accelerator for cross-linking the acrylic monomer.

5. A method according to claim 3, wherein the organosilicon precursor is polycarbosilane.

6. A method according to claim 5, wherein the polycarbosilane and the acrylic monomer are in solution in a solvent selected from hexane and 1,1,1-trichloroethane.

7. A method according to claim 3, wherein the acrylic monomer is selected from trimethylol propane trimethacrylate and trimethylol propane triacrylate.

8. A method according to claim 3, wherein the organosilicon precursor is polycarbosilane, wherein the acrylic monomer is selected from trimethylol propane trimethacrylate and trimethylol propane triacrylate, and wherein the parts by weight of polycarbosilane and of acrylic monomer in the impregnation composition are in a ratio lying in the range about 80/20 to about 40/60.

9. A method according to claim 1, wherein the fiber preform is made by shaping a fiber fabric and by holding it in tooling prior to the preform being impregnated with the impregnation composition.

10. A method according to claim 1, wherein the fiber preform is made by shaping a fiber fabric that has previously been impregnated with the impregnation composition.

11. A method according to claim 9, wherein an interphase coating is formed on the fibers of the fiber fabric prior to impregnation.

12. A method according to claim 10, wherein an interphase coating is formed on the fibers of the fiber fabric prior to impregnation.

* * * * *

UNITED STATES PATENT AND TRADEMARK OFFICE
CERTIFICATE OF CORRECTION

PATENT NO. : 5,336,522
DATED : August 9, 1994
INVENTOR(S) : Aline Balhadere, et al.

It is certified that error appears in the above-indentified patent and that said Letters Patent is hereby corrected as shown below:

Title page, item [54], in the Title, "MATRIC" should read --MATRIX--.

Title page, item [75], in the named inventors, "Bruno Bernard, Fystnes" should read --Bruno Bernard, Eysines--.

Column 1, line 2 in the Title, "MATRIC" should read --MATRIX--.

Signed and Sealed this

Seventh Day of March, 1995

Attest:

BRUCE LEHMAN

Attesting Officer

Commissioner of Patents and Trademarks